United States Patent [11] 3,610,316

[72] Inventors Otto Engel
Cologne, Sulz;
Jakob Engelmann, Cologne, Mulheim;
Kurt Wilkens, Porz-Eil, all of Germany
[21] Appl. No. 835,069
[22] Filed June 20, 1969
[45] Patented Oct. 5, 1971
[73] Assignee Klockner-Humboldt-Deutz Aktiengesellschaft
Cologne, Deutz, Germany
[32] Priority July 12, 1968
[33] Germany
[31] P 17 84 164.4

[54] ROTARY TABLE JARRING APPARATUS FOR PRODUCING LARGE MOLDED CARBON BODIES
3 Claims, 5 Drawing Figs.
[52] U.S. Cl. .................................................. 164/203, 164/39
[51] Int. Cl. ....................................................... B22c 15/10
[50] Field of Search .......................................... 164/203, 194, 260, 261, 183, 386, 409, 23

[56] References Cited
UNITED STATES PATENTS

| | | | |
|---|---|---|---|
| 891,489 | 6/1908 | Lewis | 164/183 |
| 1,113,795 | 10/1914 | Lewis | 164/203 |
| 1,344,680 | 6/1920 | Dahlmeyer | 164/203 X |
| 1,638,665 | 8/1927 | Lewis | 164/183 |
| 1,957,287 | 5/1934 | Oyster | 164/409 X |
| 2,126,738 | 8/1938 | Corbin | 164/204 |

*Primary Examiner*—J. Spencer Overholser
*Assistant Examiner*—John S. Brown
*Attorney*—Singer, Stern & Carlberg ABSTRACT: A jarring apparatus used for producing large molded carbon electrodes is provided with a rotary table which is rotated step by step to move mold boxes on the table from a point of filling them with a mass to be molded to a jarring point, and then to discharge point for the molded electrodes. At the jarring point is arranged a yieldably supported jarring table containing a driven jar-producing mechanism to operate the jarring table which by hydraulic means is raised to engage the mold boxes to be jarred to such a high level, that during the jarring operation, the mold is lifted from the rotary table. After the jarring operation, the jarring table is lowered and the mold boxes are again placed on the rotary table which moves the boxes with the electrodes therein to the electrode discharge point

PATENTED OCT 5 1971

INVENTOR
Otto Engel, Jacob Engelmann
& Kurt Wilkens
BY
Singer, Stern & Carlberg
Attorneys INVENTORS
Otto Engel, Jacob Engelmann
& Kurt Wilkens
BY
Singer, Stern & Carlberg
Attorneys

ROTARY TABLE JARRING APPARATUS FOR PRODUCING LARGE MOLDED CARBON BODIES

The invention relates to a jarring apparatus for the production of large molded carbon bodies, particularly large electrodes for the aluminum industry. The apparatus is equipped with an oscillatably mounted jarring table provided with an oscillating drive mechanism, and several mold boxes are arranged on a rotary table and are connectable one at a time to the jarring table.

It has been proposed heretofore to employ the rotary table presses for the production of carbon electrodes used in the aluminum industry. In these known presses, several mold boxes are fixedly arranged on the rotary table and are filled at a material supply point with an electrode means. Upon rotation of the table, each of the mold boxes filled with an electrode mass is placed between two pressing dies, which from above and below compress the material during one or several pressure strokes. By means of a base plate which is movable arranged in the particular mold box, the rotary table is not subjected to the stresses exerted by the pressing operation. After the completion of the pressing operation, the rotary table continues its rotation in the same direction to a discharge point, where by means of a plunger, the completely pressed electrode is lifted and, for example by means of a gripper is removed from the rotary table. By means of this known arrangement of a rotary table, it is possible to permit the three required operative working cycles,—namely, filling the mold box pressing the material therein and expelling the molded body to take place simultaneously.

The production of molded bodies having larger dimensions by means of a pressing operation, however, has a number of disadvantages. Therefore, it has recently been proposed to produce large carbon electrodes by means of a jarring device, as it is for instance disclosed in the German Gebrauchsmuster No. 1,951,457.

The use of the principle of the rotary table with a jarring apparatus is, however, not possible without the necessity of solving certain problems as in contrast to a rotary table press, owing to the high dynamic loads, the jarring device must operate independently of the rotary table.

It is an object of the invention to solve the problems arising in this connection and therefore in accordance with the present invention, the jarring table together with its vibratory yieldable support is so constructed that it can be raised and lowered, whereby the lift is so dimensioned that in its raised condition, each mold box on the rotary table located at the time above the jarring table is raised from the rotary table and then is subjected to a jarring operation.

The advantage of this arrangement is that during the jarring operation, the mold boxes are completely separated from the rotary table, so that no dynamic stresses at all are introduced by the jarring operation in the rotary table and that the lifting of the particular mold box from the rotary table may take place simply and rapidly, so that a high output of the apparatus is obtained.

In actual practice of the invention, a vibratory yieldable support is secured to a foundation plate or frame plate which is supported by several hydraulic units which are adjustable as to height. This constitutes an especially advantageous feature of the invention as in this way an automatization of the entire apparatus may be accomplished in a simple manner.

According to another object of the invention, hook-shaped bracing and centering elements are fixedly connected with at least two oppositely disposed sides adjacent the raisable and lowerable foundation plate. In this manner, it is insured that the foundation plate is braced over the hydraulic cylinder securely with the machine foundation and during the jarring operation does not perform any movement of its own: With these and other objects in view, an embodiment of the invention will now be described with reference to the accompanying drawings, in which.

Figure 1:
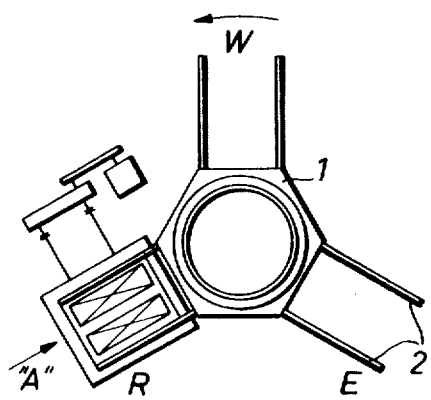
FIG. 1 illustrates diagrammatically a plan view of a jarring apparatus with a jarring table.
Figure 2:
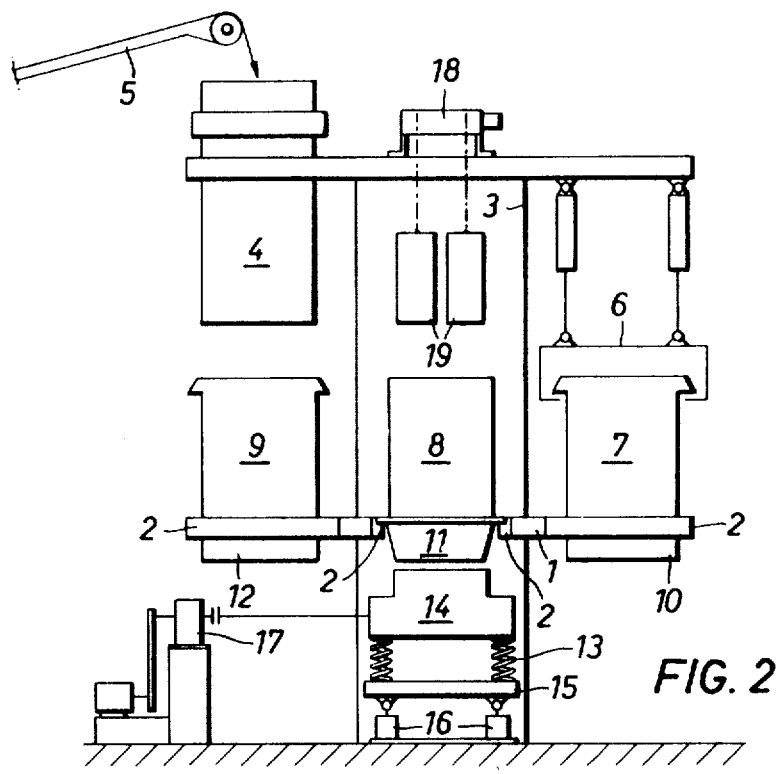
FIG. 2 shows diagrammatically a front elevation view of the jarring apparatus in the direction of the arrow "A" in FIG. 1.

FIGS. 1 and 2 show in a diagrammatic illustration in a plan view and a front elevation view a rotary table device for a jarring apparatus with a jarring table. The plan view according to FIG. 1 shows the rotary table without any mold boxes thereon. The rotary table consists essentially of a large rotating track 1, whose internal part is fixedly connected with a supporting structure and whose outer ring is rotatably arranged and is provided with a drive. At angular distances of 120° three pairs of parallel arms 2 have been fixed to the ring. These arms 2 carry or support thereon loosely arranged mold boxes. Individual features of this arrangement will be described in greater detail in connection with FIG. 4. The rotary table rotates in the direction indicated by the arrow (FIG. 1) step by step in accordance with the operating cycle of the apparatus. In the position "W" a weighing and charging device for the mass to be molded, for example, a mass of electrode material is arranged above one pair of arms. In the position "R" a discharging device for the finished jarred molded bodies is disposed below the plane of the rotary table.

In the illustrated jarring table three mold boxes are placed on the rotary table in accordance with the three operating cycles, whereby each mold box is subject to the operating cycle corresponding to its individual position, so that the three operating cycles may be completed simultaneously and a continuous production of electrodes is possible.

The front elevation view of FIG. 2 as viewed in the direction of the arrow "A" in FIG. 1 illustrates diagrammatically the setup of such a jarring apparatus. For simplification of the illustrative showing, the pairs of arms of the rotary table located in the positions "W" and "E" (FIG. 1) are shown as being rotated in a plane perpendicular to the direction of viewing. On the stationary supporting structure 3 is rotatably mounted the horizontal turntable 1 with its three pairs of arms 2. The turntable 1 is rotated by a drive mechanism not shown. On the supporting structure is disposed above the turntable 1, namely above the position "W" a container scale 4, which by means of a conveyor belt 5 is supplied with an electrode mass. Above the position "E" is disposed on the supporting structure a hydraulic lifting device 6 with whose assistance meanwhile the mold boxes 7 disposed thereunder may be raised so far that the finished jarred electrodes are disposed on a baseplate 10 and may be removed therefrom by any desired conveyor device, not described in greater detail. Each of the mold boxes 7,8 and 9, which are open at their upper ends, are placed on a baseplate 10, 11, 12 respectively which are each placed loosely on a pair of arms 2 of the rotating track 1. The jarring device is arranged below the plane of the rotary table in its position "R." The jarring device consists of a jarring table 14 carried by an elastic support formed by vertical helical springs 13. These springs 13 are secured with their lower ends to a foundation plate 15, which may be raised by means of a plurality of hydraulic cylinders. The jarring movement is produced by means of an oppositely rotating pair of imbalance weights which is positioned within the jarring table 14 and is driven by means of coupling shafts and a spur gear system 17. In the position "R" is also arranged a hoisting device 18 on the supporting structure 1 above the rotary table. This hoisting device 18 permits the lowering of top weights 19 into the mold boxes filled with an electrode mass. These top weights, after the jarring operation has taken place, may again be raised to such a high level that the rotary table may rotate one cycle further.

The operation of this jarring apparatus is substantially as follows: While under the control of the container scale 4 the mold box 9 placed below the same is filled with electrode material, the top weights 19, whose number corresponds to the subdivision of the mold boxes, is lowered into the mold box 8, until the weights engage solidly the filling in the mold boxes. Simultaneously in accordance with the invention, the foundation plate 15 is raised by means of the hydraulic cylinders 16 so far, that the base plate 11 of the mold box 8 is raised and moved away from both arms 2 of the rotary table 1,2. The mold box 8 together with the base plate 11 is now connected by means of a bracing device described in greater detail below, securely with the jarring table 14. Now the jarring operation takes place. Simultaneously with the jarring operation, the mold box 7 is raised by means of the lifting device 6, and the finished jarred electrodes are removed with a conveyor device, for example, a fork lifter, from the base plate 10 and thereupon the mold box 7 is placed again on the base plate 10.

Figure 3:
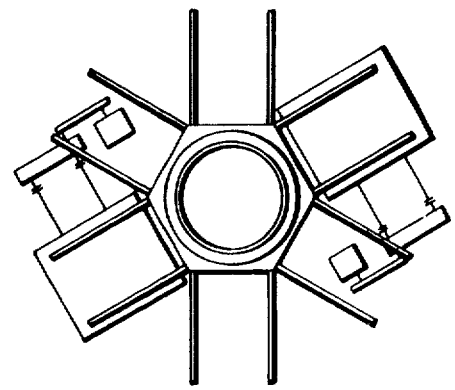
FIG. 3 is a simplified showing of a jarring apparatus with two jarring tables for doubling the output.

FIG. 3 shows a rotary table-jarring apparatus in which six pairs of arms are arranged on the rotary table, so that with the aid of two jarring devices in advantageous manner within the same space requirement, double the amount of electrodes may be produced in the same time.

Figure 4:
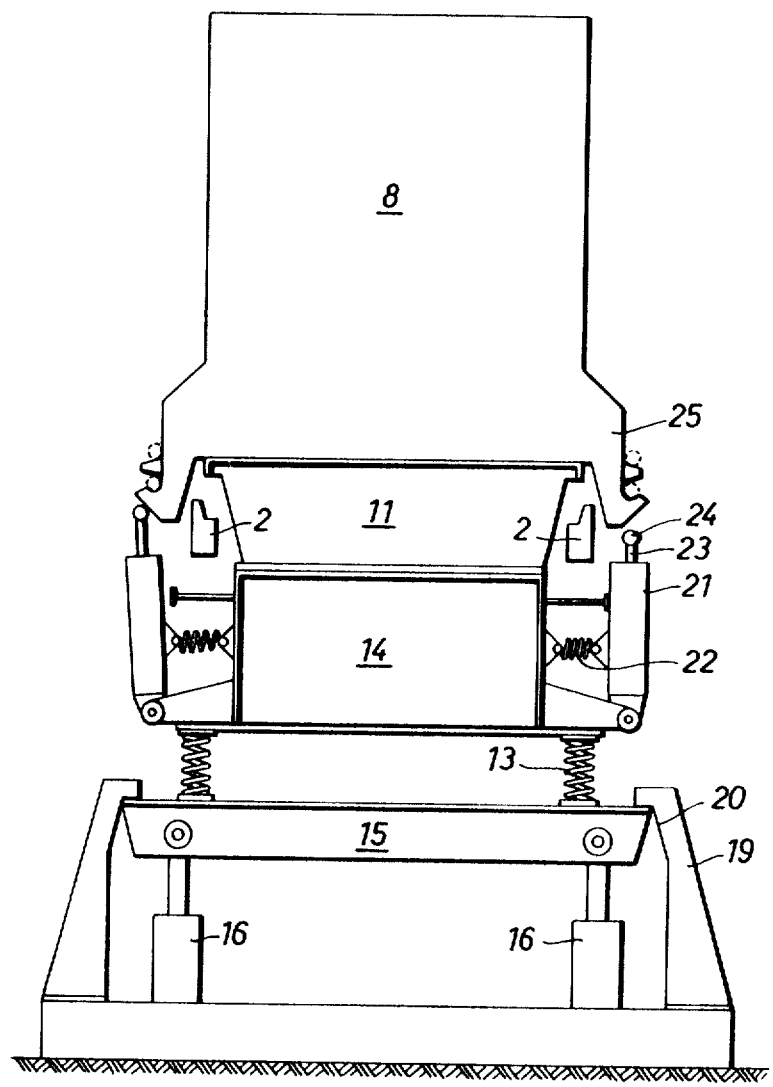
FIG. 4 is an enlarged illustration of the jarring table with mold boxes disposed thereon.

FIG. 4 shows on an enlarged scale, details of the jarring device according to the invention. The drawing shows the jarring device in a raised position. The hydraulic cylinders 16 urge the foundation plate 15 of the jarring device preferably against several bracing and centering hooks 19 connected with the stationary machine foundation. These hooks are disposed on at least two oppositely lying sides of the foundation plate 15 and suitably are so constructed, that a centering of the foundation takes place by the inclined portions on the hooks 20 which extend upwardly. These bracing and centering hooks insure in an advantageous manner, that the raisable and lowerable foundation plate 15 is moved and positioned accurately and that during the jarring operation it is braced securely to the machine foundation and thus can perform no individual movement of its own.

At two oppositely disposed sides of the jarring table 14 are also disposed each, a hydraulic bracing device for connecting the mold box and the base plate with the jarring table. This bracing device consists of each a hydraulic cylinder 21, which is pivoted with its lower end on the jarring table 14 and is held each by means of a lateral tension spring 22 approximately in vertical position.

Figure 5:
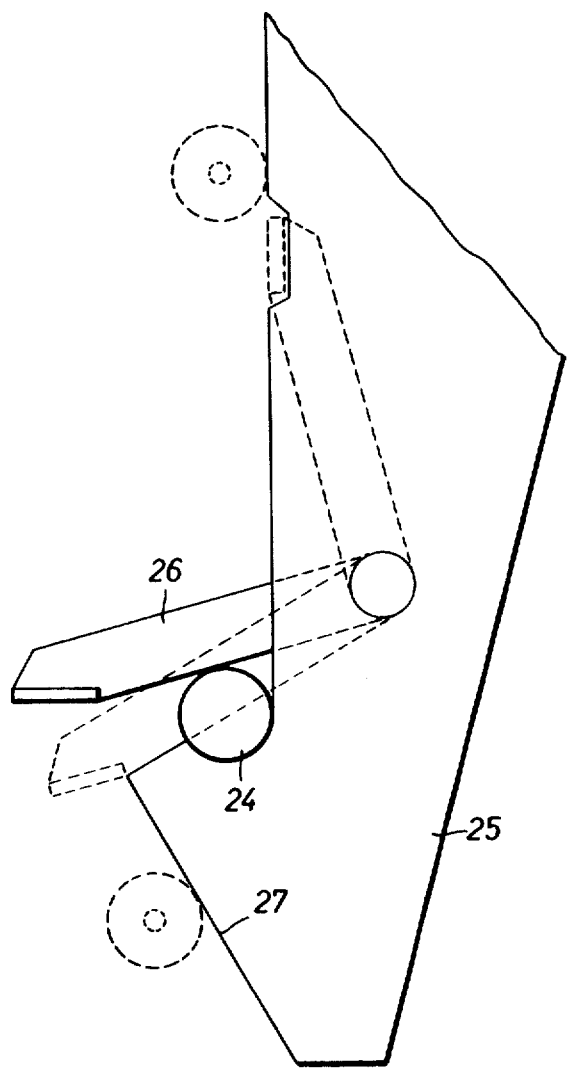
FIG. 5 illustrates diagrammatically an automatically releasing device for the bracing arrangement for the mold boxes.
Figure 5:
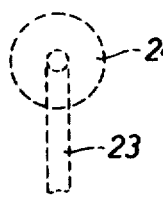

The upwardly extending piston rod 23 of each hydraulic cylinder 21 carries at its upper end a roller 24. When the piston rods are extended, the roller thereon, in view of the action of the springs 22 will automatically engage the hooks 25 provided on the mold boxes. By means of a simple reversal of the pressure oil in the cylinders 21 the mold box is then braced with its baseplate securely to the jarring table. In order to effect a simple raising and lowering of the piston rods to bring about also an automatic release of the rollers 24 from the hooks 25, after the jarring operation has taken place, a pawl arrangement such as shown by way of example in FIG. 5, is very suitable. On each of the two hooks 25 is arranged a rotatably mounted pawl 26 above the cavity of the hook. The roller 24 on the piston rod 23 rolls upon extension of the piston rod onto the lower face 27 of the hook 25, whereby it is urged by means of the tension spring 22 shown in FIG. 4 against this face 27. Upon further extension, the pawl 26 is likewise raised, until the roller 24 finally engages the cavity of the hook 25 due to the action of the spring 22.

If now after the jarring operation has taken place, the piston rod 23 is extended further, then the roller 24 lifts the pawl 26 higher and finally rolls off the outer free end of the pawl. The pawl 26 drops back into its starting position, so that now upon retraction of the piston rod 23 the roller 24 rolls off or down on the upper side of the pawl 26 and cannot engage in the cavity of the hook covered by the pawl. Now the jarring table may be lowered and rotated further to the position E. The advantage of this automatic bracing device is that all control functions can solely be carried out by means of a simple control of the pressure oil for the pressure cylinder 21. In this way, the equipment of the entire installation with a completely automatic control installation is substantially facilitated.

FIG. 4 shows the advantage of the construction of the jarring apparatus according to the invention. In a raised condition of the jarring table, the baseplate 11 is raised above the two arms 2 of the rotary table so that the jarring operation takes place without any contact with the rotary table. After the jarring operation has taken place, the bracing device 21 to 24 is released, and the foundation plate 15 is again lowered, so that the mold box 8 with the base plate 11 is carried again by the pair of arms 2 of the turntable and may be further rotated to the discharge device.

What we claim is:

1. In a jarring apparatus for producing large molded carbon bodies, particularly large electrodes for use in the aluminum industry, in which a yieldably mounted jarring table is provided with an oscillating drive and including a rotary table on which several mold boxes are arranged which latter are connectable with said jarring table, the improvement comprising a yieldable support for said jarring table and lifting means for raising and lowering the jarring table together with said yieldable support, said lifting means comprising a foundation plate on which said yieldable support is secured and a plurality of hydraulic units adjusting said foundation plate, said lifting means being so dimensioned that the mold box carried by the rotary table can be raised above the rotary table along with the jarring table.

2. An apparatus according to claim 1, including means on said jarring table for lockingly engaging a mold box when said jarring table has engaged the bottom of said mold box and has lifted it from said rotary table, whereby the jarring movements of said jarring table are intimately transmitted to said mold box and any jarring movements are kept away from said rotary table, said means comprising two vertically disposed hydraulic cylinders pivotally mounted with their lower ends to opposite sides of said jarring table and provided with upwardly extending piston rods, each having a roller at its upper end adapted to engage upwardly facing cavities in hooks arranged at the lower end of the mold box, yieldable means between each said hydraulic cylinders and said jarring table for holding said cylinders in a substantially vertical position and for urging said rollers in locking engagement with said cavities in said hooks, and a pawl pivotally attached to each hook and adapted upon vertical movement of said piston rods to be engaged by said rollers when the same are raised from the cavities in said hooks and to be pivoted upwardly until said rollers move off said pawls and causing the latter to drop and cover said cavities in said hooks, so that upon retraction of said piston rods the rollers thereon move downwardly over said pawls and along said hooks without engaging the cavities therein.

3. An apparatus according to claim 5, including at least two vertically disposed hook-shaped bracing and centering elements arranged at two opposite sides and adjacent said foundation plate for limiting the vertical adjustment of the latter, said bracing and centering elements being fixedly secured to a foundation supporting said apparatus.